(12) United States Patent
Hübner et al.

(10) Patent No.: US 7,360,268 B2
(45) Date of Patent: Apr. 22, 2008

(54) SEAL FOR AIRCRAFT BOARDING STAIRS OR BOARDING BRIDGE

(75) Inventors: Reinhard Hübner, Kassel (DE); Michael Müller, Erlau (DE)

(73) Assignee: Hubner GmbH, Kassel (DE)

( * ) Notice: Subject to any disclaimer, the term of this patent is extended or adjusted under 35 U.S.C. 154(b) by 0 days.

(21) Appl. No.: 11/506,972

(22) Filed: Aug. 18, 2006

(65) Prior Publication Data

US 2007/0107147 A1 May 17, 2007

(30) Foreign Application Priority Data

Aug. 20, 2005 (DE) ...................... 10 2005 039 472

(51) Int. Cl.
*E01D 15/10* (2006.01)
*E01D 1/00* (2006.01)

(52) U.S. Cl. ...................................................... 14/71.5
(58) Field of Classification Search ................. 14/69.5, 14/71.2, 71.5
See application file for complete search history.

(56) References Cited

U.S. PATENT DOCUMENTS

| 5,421,052 | A | * | 6/1995 | Koch | 14/69.5 |
| 5,603,343 | A | * | 2/1997 | Larson | 135/131 |
| 6,418,582 | B1 | * | 7/2002 | Petit | 14/71.5 |
| 7,069,611 | B2 | * | 7/2006 | Larson | 14/71.3 |
| 2004/0211014 | A1 | * | 10/2004 | Larson | 14/71.1 |

FOREIGN PATENT DOCUMENTS

| DE | 30 23 885 A1 | 1/1982 |
| DE | 33 06 109 C2 | 9/1983 |

* cited by examiner

*Primary Examiner*—Raymond W Addie
(74) *Attorney, Agent, or Firm*—Thomas R. Vigil

(57) ABSTRACT

The Object of the invention as a seal for aircraft boarding stairs or for an aircraft boarding bridge, said seal comprising a U-shaped bellows (5) spanning a gangway bottom plate (10), said bellows (5) comprising a flexible frame (3) at its one open end, said flexible frame having a bumper (4) made from an elastically resilient material, whereby the bellows (5) is separable.

9 Claims, 4 Drawing Sheets

SEAL FOR AIRCRAFT BOARDING STAIRS OR BOARDING BRIDGE

FIELD OF THE INVENTION

The invention relates to a seal for aircraft boarding stairs or for an aircraft boarding bridge, said seal comprising a bellows that spans a gangway bottom plate, said bellows comprising a flexible frame at its one open end, said flexible frame having a bumper made from an elastically resilient material.

DESCRIPTION OF THE PRIOR ART

Aircraft boarding stairs or boarding bridges are well known (e.g., from DE 30 23 885 A1, EP 0 277 648 A1, DE 33 06 109 C2). They serve to board the aircraft. Such type aircraft boarding stairs or boarding bridges have an extendable bellows that spans the space between the aircraft boarding stairs or the aircraft boarding bridge and the aircraft in order to protect from weather passengers boarding the plane. The bellows is of a substantially U-configuration type, with the bellows being closed at its bottom by the bottom plate of a gangway. As already explained above, the bellows comprises a flexible frame with a bumper made from an elastically resilient material. At the transition between the flexible frame and the bellows there is provided a transition cloth that is connectable on one side with the bellows, with its other end being connected to the flexible frame. The flexibility of the frame is needed since this frame has the function of ensuring that the aircraft boarding bridge or the aircraft boarding stairs do conform to the shape of the aircraft body. A rigid frame would not be able to perform this function.

The bumper is intended to prevent the outer skin of the aircraft from being damaged when the flexible frame is fit thereagainst.

Such bellows, which are formed in a U-shape configuration, more specifically in a pleated bellows configuration, have a height of at least 3.40 m and a width of about 3 m. This means that such type bellows can only be shipped by special transport vehicles, which is quite expensive.

BRIEF SUMMARY OF THE INVENTION

It is therefore the object of the invention to provide a bellows of the type mentioned herein above that can be readily transported.

In accordance with the invention, the solution to this object is to provide a separable bellows. If the bellows is separable, the discrete parts of the bellows can be transported in plain trucks without much expense.

There is more specifically provided that the U-shaped bellows has two legs that are joined together by a web, said bellows being separable at least in the region of the one leg, preferably however in the region of the two legs. It will be obvious therefrom that, in the separated condition, the bellows consists of three elements, namely two legs and one web. These parts are assembled after transport.

In this context, there is more specifically provided that the flexible frame forms a pocket in the region of the bellows' web, with the flexible frame forming a tongue for reception by the pocket in the region of the leg. Meaning, the two legs are connected to the web of the bellows for assembly, namely more specifically by the fact that the frame forms a pocket in the region of the flexible frame and that the tongue of a respective one of the legs is inserted into said pocket. The tongue is fixed such as by screwing in the pocket of the flexible frame.

A variant is also claimed in which the flexible frame of the bellows' web comprises a tongue that is receivable by a corresponding pocket.

To connect the discrete pleats of the pleated bellows' leg to the pleats of the pleated bellows' web, there is provided that the pleats overlap each other, releasable connecting means, more specifically hook and loop tapes, being provided in the overlap region. The cloth of the pleats is not the only element to be connected though; it is also known that the pleats in the pleat bottom or at the pleat crest are joined together by bellows frames. These bellows frames are also separated, with these parts of a bellows frame being connected by transmission profiles. The term "transmission profiles" is understood to refer to profiles that are placed onto the ends of the separated bellows frames and are connected therewith by means of screws or rivets.

In principle, the above explanations apply in equivalent fashion to corrugated bellows.

As already discussed above, the tongue of the flexible frame of the leg of a pleated bellows is fixed in the pocket of the bellows' web by means of screws. Another possibility is to fix the tongue in the pocket by means of a click connection. In this context, there is provided that both the tongue and the pocket comprise a profile such as in the form of a serrated profile. This profile is aligned so as to allow the tongue to be inserted into the pocket but to prevent it from being pulled out. The reason therefore is that once the bellows has been assembled in situ it needs not be disassembled any more. In the event disassembly should become necessary, there is provided that the pocket be formed by two superposed, spaced-apart frame elements that are releasably joined together such as by screws or rivets.

The invention will be explained in closer detail herein after with reference to the drawings.

DETAILED DESCRIPTION OF THE INVENTION

Figure 1:
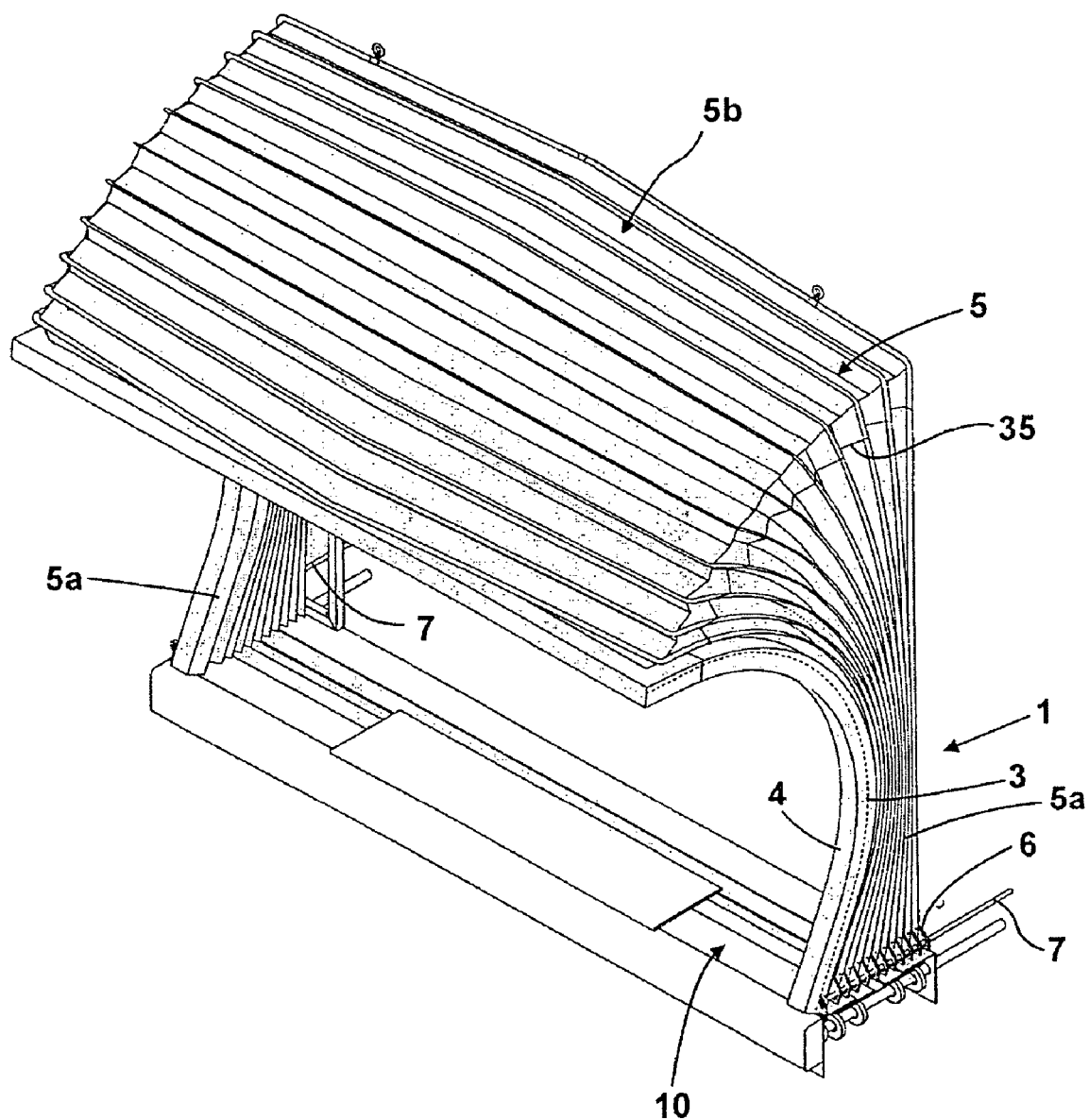
FIG. 1 is a perspective view of the seal of aircraft boarding stairs or of an aircraft boarding bridge.
Figure 2:
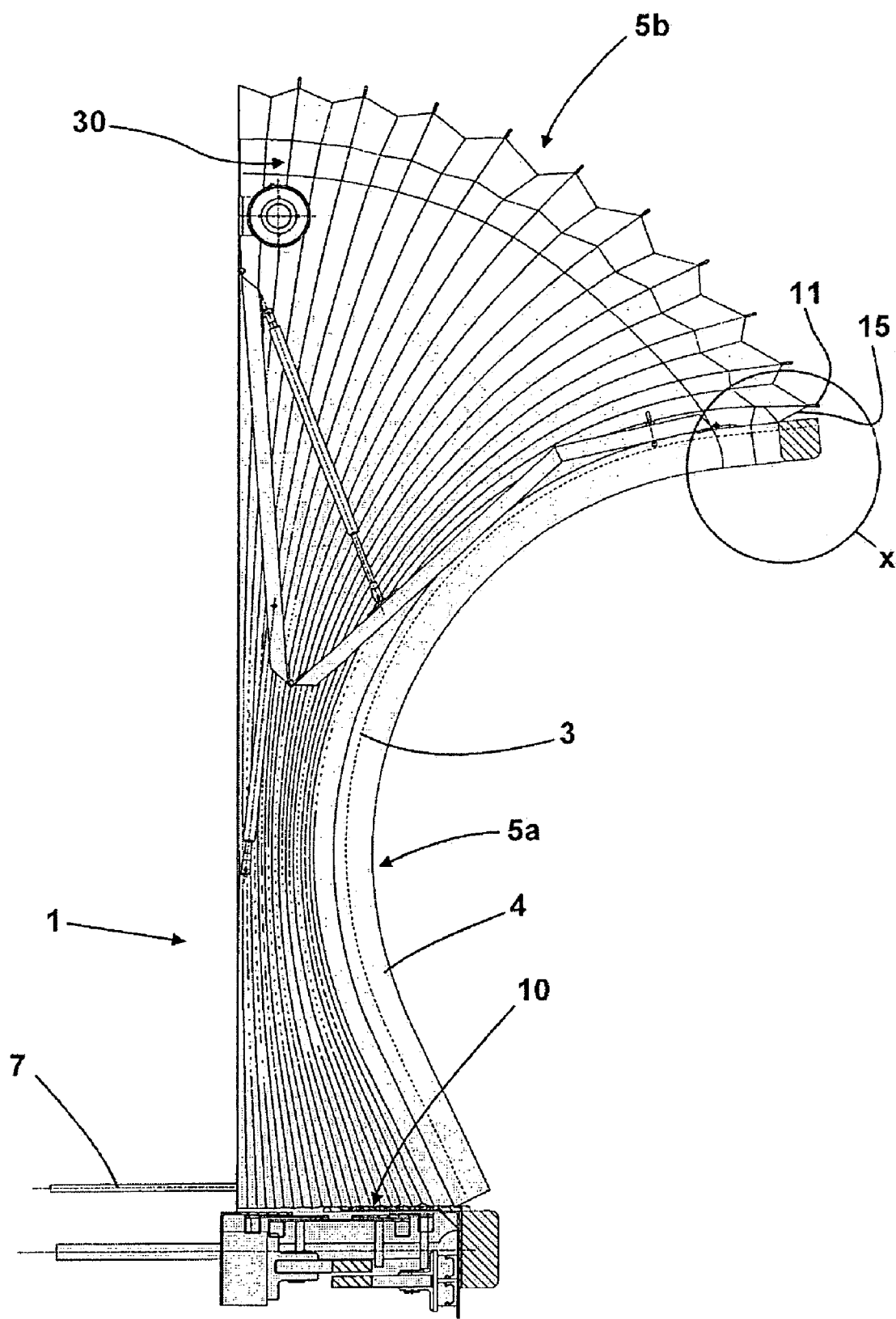
FIG. 2 is a side view as shown in FIG. 1.

According to the FIGS. 1 and 2, the seal 1 of aircraft boarding stairs or of an aircraft boarding bridge includes the flexible frame 3 which receives at its end the bumper 4 made from an elastically resilient material such as foam rubber and the pleated bellows 5 adjoining the elastic frame. Like the flexible frame, the pleated bellows 5 has a U-shaped contour and spans the gangway bottom plate indicated generally at 10. In the bottom region of the two legs 5a of the bellows 5, which are joined by the web 5b, the bellows has a plurality of bellows eyelets disposed one behind the other and received by the guide rail 7, said guide rail 7 being itself fastened at its ends to the flexible frame 3 on the one side and to the aircraft boarding stairs or the aircraft boarding bridge (not shown) on the other side.

Figure 3:
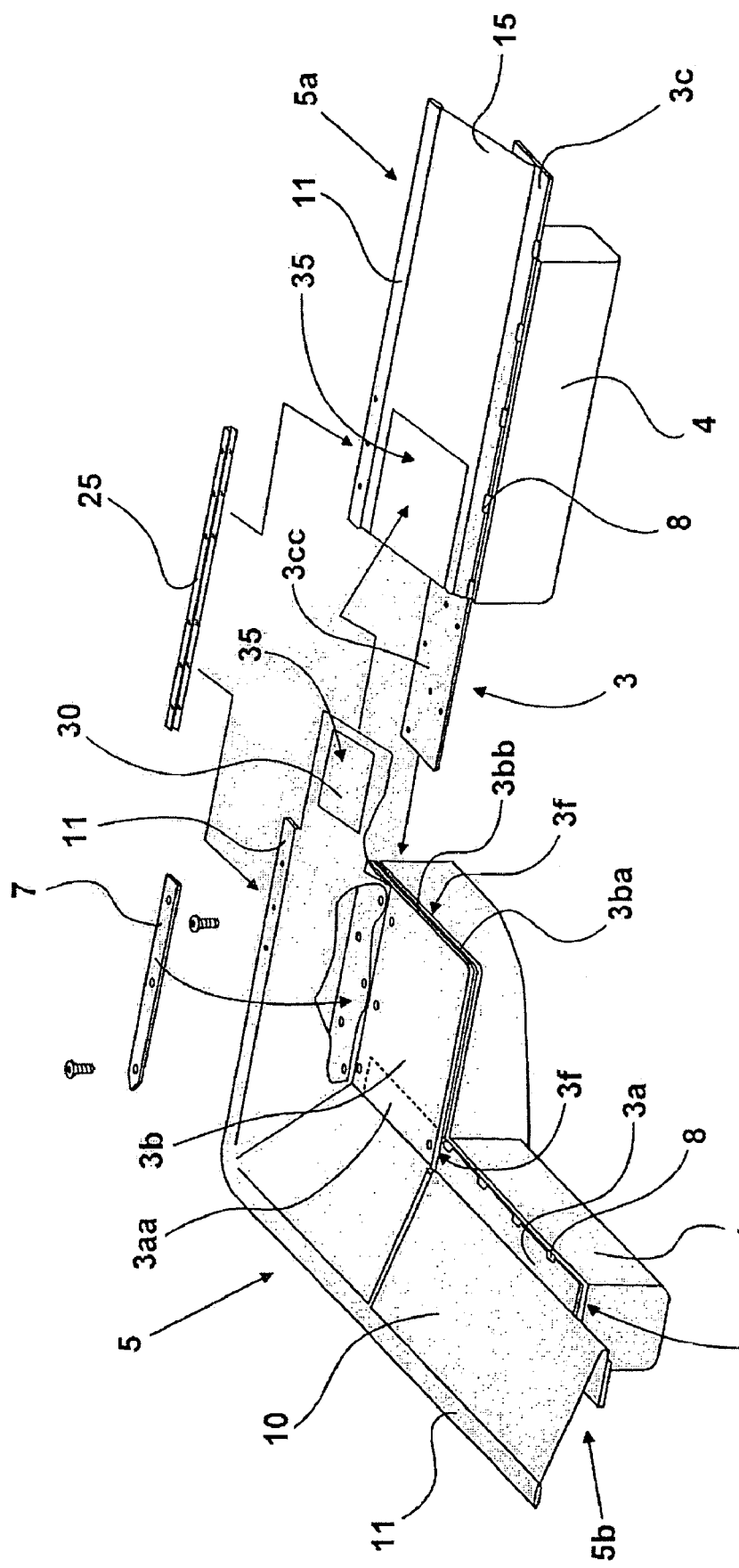
FIG. 3 is an exploded view showing the connection of the leg of a bellows to the web of said bellows in accordance with the detail "X" of FIG. 2.

The invention is now directed to the separability of the legs 5a from the web 5b of the bellows, as can be seen from the exploded view shown in FIG. 3. From the illustration shown in FIG. 3 it can be seen that the flexible frame 3 of the bellows 5 is connected to the bellows frame 11 of the bellows' pleats through the transition cloth 15. The web 5b of the bellows has the flexible frame web indicated at 3a to which the bumper 4 is fastened. The flexible frame web 3a has a tongue 3aa at its end, said tongue being received by a corner connection 3b which is formed by two superposed spaced-apart frame elements 3ba and 3bb. The pocket 3f is formed by the two spaced-apart frame elements 3ba, 3bb. This corner connection 3b receives the tongue 3aa of the frame web 3a on the one side and on the other side the tongue 3cc of the frame leg 3c of the flexible frame 3. The pocket 3f of the corner connection also serves this purpose. The two tongues are fixed in the corner connection 3b by means of screws.

As already explained above, the flexible frame 3 is not the only element that is separated, the bellows 5 itself is separated as well. The bellows 5, in the instant case a pleated bellows is shown, has what are referred to as bellows frames 11, said bellows frames being provided both in the pleat bottom and at the pleat crest and serving to stabilize the bellows. The bellows frames 11 are also configured to be separate parts, what is referred to as a transmission profile 25 that can be placed onto the neighboring end parts of the separated bellows frames 11 and is connectable thereto by means of screws or rivets being provided for connection of the respective end parts of the bellows frame 11.

The ends of the separated transition cloth 15 of the pleated bellows as well as the pleats of the bellows itself must also be joined together. Overlaps 30 for cloth and pleats, which are adapted to be joined together such as by hook and loop tapes illustrated by the arrow 35, are provided for this purpose.

The bumper 4 itself is connected to the flexible frame 3 by hook and loop tapes. The transition cloth 15 is fixed to the flexible frame 3 by means of clips 8. Since such a fixation by means of clips 8 is not possible in the region of the corner connector 3b, a holding metal sheet 17 is provided that is disposed on the corner connector 3b by means of screws.

Figure 4:
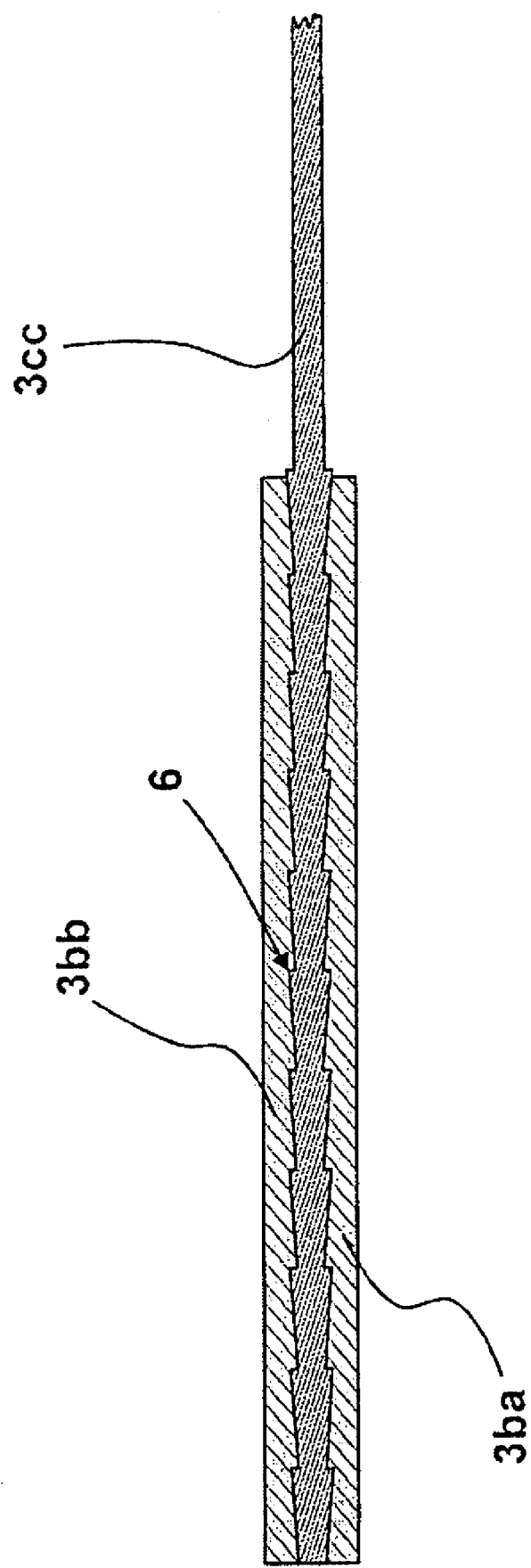
FIG. 4 schematically shows an embodiment in which the tongue of the leg of the bellows is snap-fitted in the pocket of the web.

Another subject matter of the invention is the special configuration of the tongue 3aa, 3cc in connection with the pocket 3f in the corner connector 3b (FIG. 4). As already explained, the pocket 3f is formed by two superposed frame elements 3ba and 3bb, the inner faces of the pocket 3f and the tongue 3aa, 3bb being equipped with detents formed like a fine serrated profile in such a manner that the tongue 3aa, 3cc is allowed to be inserted into the pocket 3f but is prevented from being pulled out. The detent pattern shown in FIG. 4, which may also be configured in the fashion of a scaling, is indicated generally at 6.

We claim:

1. A seal for aircraft boarding stairs or a boarding bridge, including a U-shaped bellows (5) spanning a gangway bottom plate (10), said bellows (5) comprising a flexible frame (3) at its one open end, said flexible frame having a bumper (4) made from an elastically resilient material, wherein the U-shaped bellows (5) comprises two legs (5a) that are joined together by a web (5b), said bellows (5) being separable at least in the region of at least one of the two legs (5a) and wherein the flexible frame (3) forms a pocket (3f) in the region of the web (5b) of the bellows (5), said flexible frame (3) of the leg (5a) and/or of the web (5b) of said bellows (5) comprising a tonque (3aa, 3cc for reception by the pocket (3f).

2. The seal for aircraft boarding stairs or for an aircraft boarding bridge as set forth in claim 1, whereby the bellows (5) is configured to be pleated or a corrugated bellows, the discrete pleats or corrugations being joined together by bellows frames (11), said bellows frames (11) comprising, in the region of the separation in the bellows (5), a transmission profile (15) for connection, and said corrugations or pleats being joined together overlapping each other in the region of the separation by means of connecting means such as hook and loop tapes (35).

3. The seal for aircraft boarding stairs or for an aircraft boarding bridge as set forth in claim 1, whereby the tongue (3cc) is flexible in the pocket (3f) by means of screws.

4. The seal for aircraft boarding stairs or for an aircraft boarding bridge as set forth in claim 1, whereby the tongue (3aa, 3cc) is fixable in the pocket (3f) by a snap-fit connection.

5. The seal for aircraft boarding stairs or for an aircraft boarding bridge as set forth in claim 4, whereby both the tongue (3aa, 3cc) and the pocket (3f) comprise a profile (6).

6. The seal for aircraft boarding stairs or for an aircraft boarding bridge as set forth in claim 1, whereby the pocket (3f) is formed by two superposed and spaced-apart frame elements (3ba, 3bb) that are connectable together such as by screws or rivets.

7. The seal for aircraft boarding stairs or for an aircraft boarding bridge as set forth in claim 1 wherein said bellows (5) is separable in the region of the two legs (5A).

8. The seal for aircraft boarding stairs or for an aircraft boarding bridge as set forth in claim 5 wherein said profile is in the form of a serrated profile.

9. The seal for aircraft boarding stairs or for an aircraft boarding bridge as set forth in claim 5 wherein said profile is in the form of a scaling.

* * * * *